United States Patent [19]

Kashimura et al.

[11] Patent Number: 4,730,890
[45] Date of Patent: Mar. 15, 1988

[54] PLUG SET FOR OPTICAL CONNECTOR FOR OPTICAL FIBER CABLES

[75] Inventors: Noritake Kashimura, Ohmiya; Hiroaki Saitoh, Kawaguchi, both of Japan

[73] Assignee: Dai-Ichi Seiko Co., Ltd., Kawaguchi, Japan

[21] Appl. No.: 443,886

[22] Filed: Nov. 23, 1982

[30] Foreign Application Priority Data

Nov. 27, 1981 [JP] Japan .................................. 56-189301

[51] Int. Cl.⁴ ................................................ G02B 6/36
[52] U.S. Cl. .................................. 350/96.20; 350/96.21
[58] Field of Search ............... 350/96.20, 96.21, 96.22, 350/96.23

[56] References Cited

U.S. PATENT DOCUMENTS 4,290,668  9/1981  Ellis et al. ..................... 350/96.21

FOREIGN PATENT DOCUMENTS 0029601  6/1981  United Kingdom ............. 350/96.20

Primary Examiner—William L. Sikes
Assistant Examiner—Akm E. Ullah
Attorney, Agent, or Firm—Cushman, Darby & Cushman

[57] ABSTRACT

A plug set for optical connector for optical fiber cables arranged to fix reinforcing fibers of an optical fiber cable by at first placing the reinforcing fibers round an outer surface of an end portion of a bushing for inserting the optical fiber cable therein, attaching a thermo-shrinkable tube to the end portion of the bushing after the above so that the reinforcing fibers are covered with the thermo-shrinkable tube and, then, heating the tube so that the tube shrinks, the plug set for optical connector being arranged to thereby fix the reinforcing fibers without using a bonding agent.

4 Claims, 3 Drawing Figures

PLUG SET FOR OPTICAL CONNECTOR FOR OPTICAL FIBER CABLES

BACKGROUND OF THE INVENTION (a) Field of the Invention

The present invention relates to a plug set for optical connector for optical fiber cables and, more particularly, to the construction of a portion thereof for mounting the plug set to the optical fiber cable, (b) Description of the Prior Art When mounting known plug sets for optical connectors to optical fiber cables, an inner shield member 2 of an optical fiber cable 1 is inserted into a bushing 11 of a plug set 10 for an optical connector as shown in FIG. 1, reinforcing fibers 3 (for example, made of synthetic resin such as aromatic polyamide) of the optical fiber cable 1 is inserted into a space between an end portion 11a of the bushing 11 and a collar 12, and a tightening nut 13 is screwed onto the bushing 11 in order to thereby fix the plug set to the optical fiber cable. At that time, it is necessary to firmly fix the reinforcing fibers 3 of the optical fiber cable 1 to the plug set 10 of the optical connector. In FIG. 1, numeral 15 designates a frame screwed onto the bushing 11, numeral 16 designates a spring, numeral 17 designates a nut, and numeral 18 designates a ferrule for fixing the end of optical fiber of the optical fiber cable. Therefore, at present, the reinforcing fibers 3 are bonded to the end portion 11a of the bushing 11 by means of a bonding agent and, then, the collar 12 is mounted. However, this method has a disadvantage that the bonding agent adheres to portions other than the portion to be bonded and, consequently, component parts of the plug set become dirty. Besides, it takes time until the bonding agent dries.

FIG. 2 shows another known means for mounting a known plug set for optical connector to an optical fiber cable. In case of this known plug set, an end portion 11'a of a bushing 11' and an end portion 12'a of a collar 12' are formed to have tapered surfaces and it is so arranged that reinforcing fibers 3 are inserted into a space between those tapered surfaces and fixed by tightening a tightening unit 13' so that the reinforcing fibers 3 are thereby held fixedly between the above-mentioned tapered surfaces. In this method, the reinforcing fibers are fixed comparatively powerfully because they are tightened by utilizing the tapered surfaces. However, even in this case, the reinforcing fibers cannot be fixed satisfactorily firmly and, therefore, it is necessary to firmly fix the reinforcing fibers by bonding them using a bonding agent in the same way as the case of known plug set shown in FIG. 1. Consequently, the above-mentioned disadvantages occur also in this case.

SUMMARY OF THE INVENTION

It is, therefore, a primary object of the present invention to provide a plug set for optical connector for optical fiber cables arranged to fix the reinforcing fibers by placing the end portions of the reinforcing fibers round the end portion of a bushing, attaching a tube made of thermo-shrinkable material to the end portion of the bushing so that the end portions of the reinforcing fibers are covered with the tube, and shrinking the tube by heating it so that the end portions of the reinforcing fibers are thereby fixed by the tube.

DETAILED DESCRIPTION OF THE PREFERRED EMBODIMENT

Now, the plug set for optical connector for optical fiber cables according to the present invention is described in detail based on an embodiment illustrated on an accompanying drawing.

Figure 1:
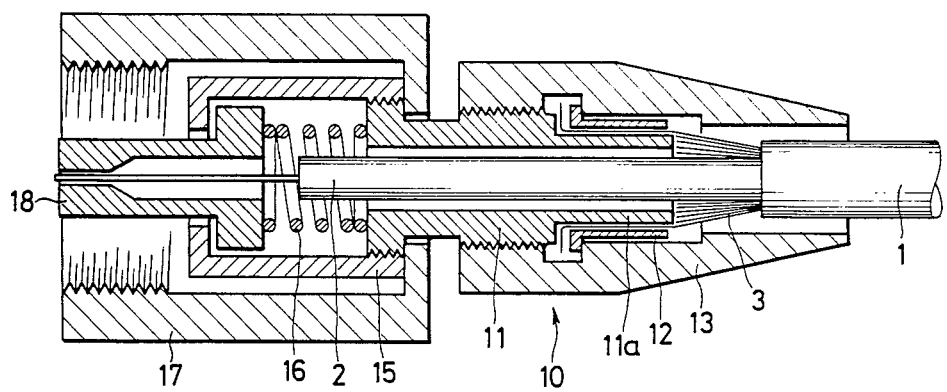
FIG. 1 shows a sectional view illustrating a known plug set for optical connector for optical fiber cables.
Figure 2:
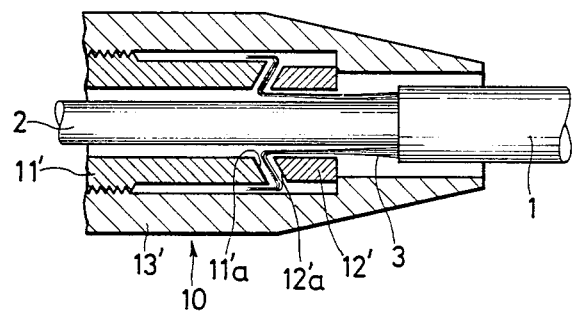
FIG. 2 shows a sectional view illustrating a part of another known plug set for optical connector for optical fiber cables.
Figure 3:
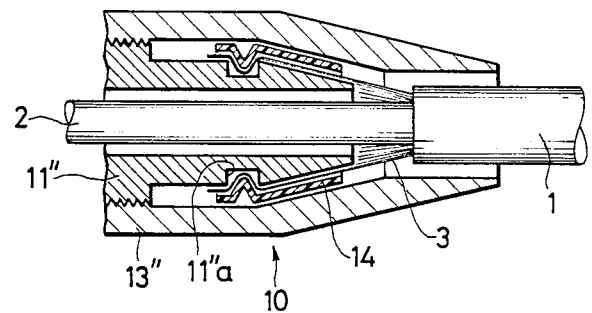
FIG. 3 shows a sectional view illustrating the essential portion of the plug set for optical connector for optical fiber cables according to the present invention.

In FIG. 3 showing an embodiment of the plug set according to the present invention, numeral 1 designates an optical fiber cable, numeral 2 designates an inner shield member constituting the optical fiber cable 1, numeral 3 designates reinforcing fibers constituting the optical fiber cable 1, and these are the same as those shown in FIGS. 1 and 2. Numeral 10 designates a plug set for optical connector, numeral 11" designates a bushing constituting the plug set 10, numeral 13" designates a tightening nut constituting the plug set 10, and these are also constructed to have shapes similar to those of known plug sets shown in FIGS. 1 and 2. Numeral 14 designates a tube made of thermo-shrinkable plastic material.

The plug set for optical connector for optical fiber cables according to the present invention constructed as described in the above is arranged to firmly fix the reinforcing fibers as explained below. That is, the inner shield member 2 of the optical fiber cable 1 is inserted into the bushing 11" and end portions of the reinforcing fibers 3 are placed round the outer surface of the end portion of the bushing 11". After that, the thermo-shrinkable tube 14 is attached to the end portion of the bushing 11" so that it covers the end portions of the reinforcing fibers 3 placed round the outer surface of the end portion of the bushing 11". Then, the thermo-shrinkable tube 14 is shrinked by heating it, and the reinforcing fibers 3 are thereby fixed firmly between the bushing 11" and tube 14. After that, the tightening nut 13" is screwed onto the bushing 11". When the bushing 11" is formed to have an annular concave portion 11a" as shown in FIG. 3, a part of the tube 14 enters the concave portion 11"a at the time of shrinkage. As a result, after the tube 14 shrinks and hardens, the reinforcing fibers are perfectly fixed by the concave portion 11"a and convex portion of the tube 14 which entered the concave portion 11"a. Therefore, the fixing effect is extremely large. Besides, as the tube 14 is tightened by the tightening nut 13", the effect for tightening the reinforcing fibers is still larger.

Moreover, when the end portion of the bushing 11" is arranged to have a tapered outer surface and the tightening nut 13" is arranged to have a tapered inner surface as shown in FIG. 3, the reinforcing fibers are fixed still more reliably.

The heating process for shrinking the thermo-shrinkable tube may be carried out after screwing the tightening nut 13".

As described in the above, the plug set for optical connector for optical fiber to fix the reinforcing fibers by utilizing shrinkage of the tube made of thermo-shrinkable material. Therefore, it is not necessary to bond the reinforcing fibers by a bonding agent and, consequently, the component parts of the plug set and related parts are not stained with the bonding agent. Besides, as the time for drying the bonding agent is not required, it is possible to shorten the working time for connecting the optical fiber cables. Moreover, as the assembling process is simple, it is convenient for the connecting work.

We claim:

1. A plug set for optical connection for optical fiber cables comprising a bushing having a bore for receiving an inner shield member of an optical fiber cable and having an end portion with a tapered outer surface formed so that said tapered outer surface becomes smaller in diameter toward said end portion thereof, a thermo-shrinkable tube means for attachment to a portion of the outer surface of said bushing including said tapered outer surface with reinforcing fibers of said optical fiber cable being placed around at least a portion of said outer surface of said bushing including said tapered outer surface so that said reinforcing fibers are covered with said thermo-shrinkable tube, and a tightening nut to be screwed onto said bushing in order to tighten and fix said reinforcing fibers to said bushing with said thermo-shrinkable tube attached therebetween, said plug set for optical connector for optical fiber cables being arranged to fix said reinforcing fibers to said bushing by heating said thermo-shrinkable tube after attaching said thermo-shrinkable tube to said bushing, said tightening nut having an interior surface which is tapered and is positionable next to said tapered outer surface of said bushing.

2. A plug set for optical connector for optical fiber cables according to claim 1 wherein an annular concave portion is formed on the outer surface of said bushing.

3. A plug set for optical connector for optical fiber cables according to claim 1 wherein said thermo-shrinkable tube is formed to be larger in diameter at one end, which becomes the leading end when said thermo-shrinkable tube is fitted onto said bushing, compared with the other end.

4. A plug set for optical connection for optical fiber cables comprising a bushing having a bore for receiving an inner shield member of an optical fiber cable and having an end portion with a tapered outer surface formed so that said tapered outer surface becomes smaller in diameter toward said end portion thereof, a thermo-shrinkable tube means for attachment to a portion of the outer surface of said bushing including said tapered outer surface with reinforcing fibers of said optical fiber cable being placed around at least a portion of said outer surface of said bushing including said tapered outer surface so that said reinforcing fibers are covered with said thermo-shrinkable tube, and a tightening nut to be screwed onto said bushing in order to tighten and fix said reinforcing fibers to said bushing with said thermo-shrinkable tube attached therebetween, said plug set for optical connector for optical fiber cables being arranged to fix said reinforcing fibers to said bushing by heating said thermo-shrinkable tube after attaching said thermo-shrinkable tube to said bushing, said bushing having an annular concave portion on the outer surface thereof.

* * * * *